Oct. 15, 1935.  B. STOCKFLETH  2,017,448
METHOD OF MAKING BEARINGS
Filed Feb. 4, 1931  2 Sheets-Sheet 1
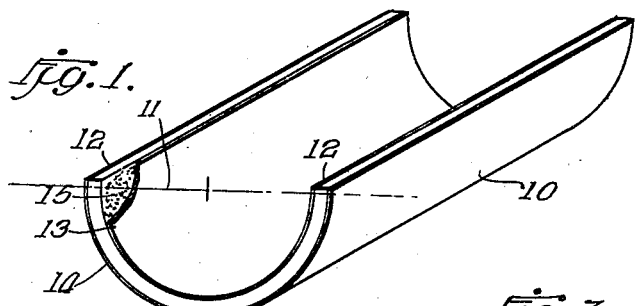
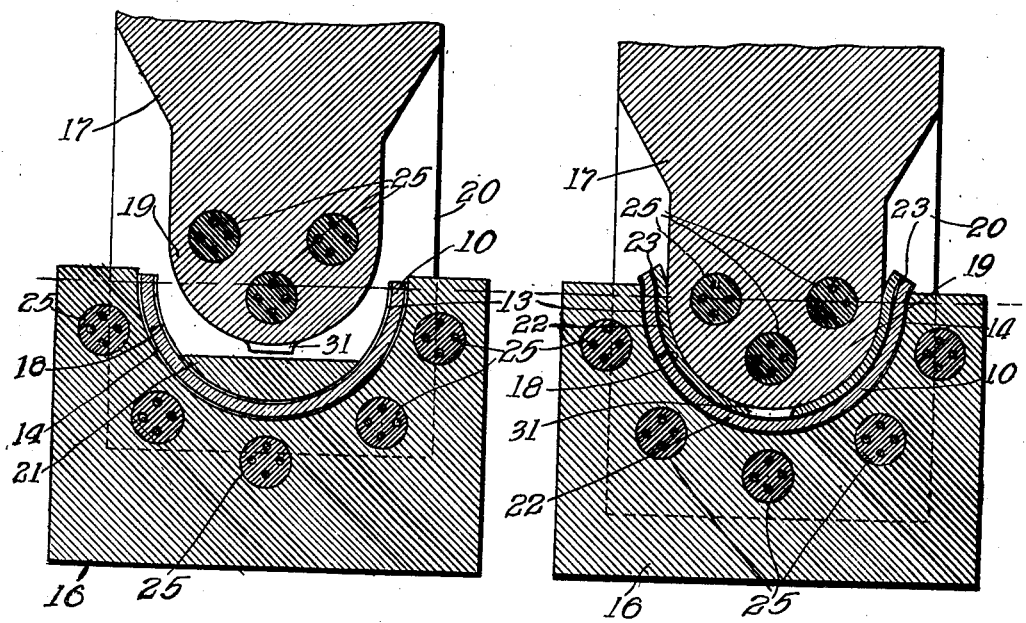
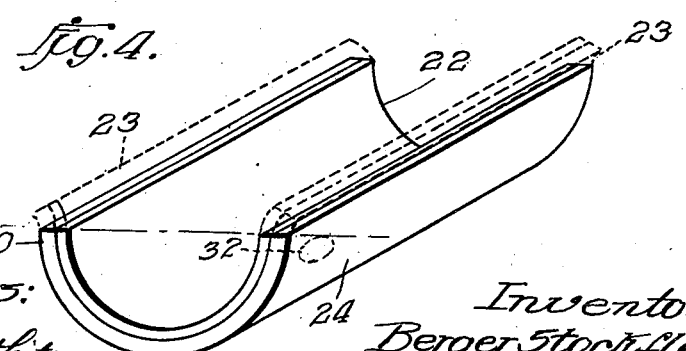
Inventor
Berger Stockfleth
By Edward Fay Wilson
atty.
Witnesses:
Harry C. L. White Oct. 15, 1935.   B. STOCKFLETH   2,017,448
METHOD OF MAKING BEARINGS
Filed Feb. 4, 1931   2 Sheets-Sheet 2
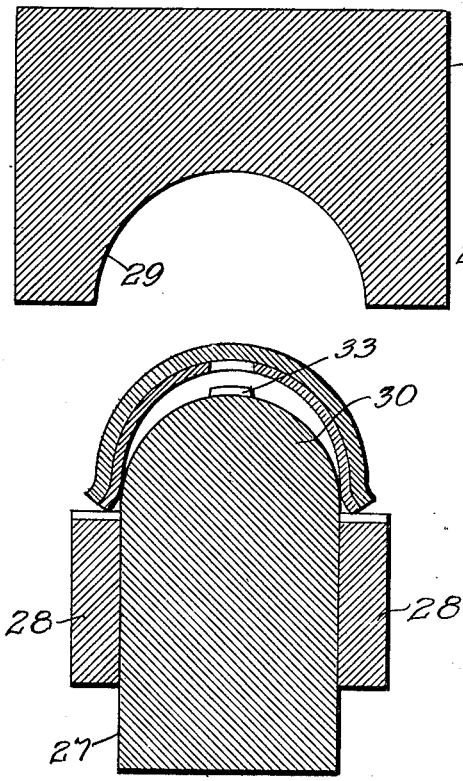
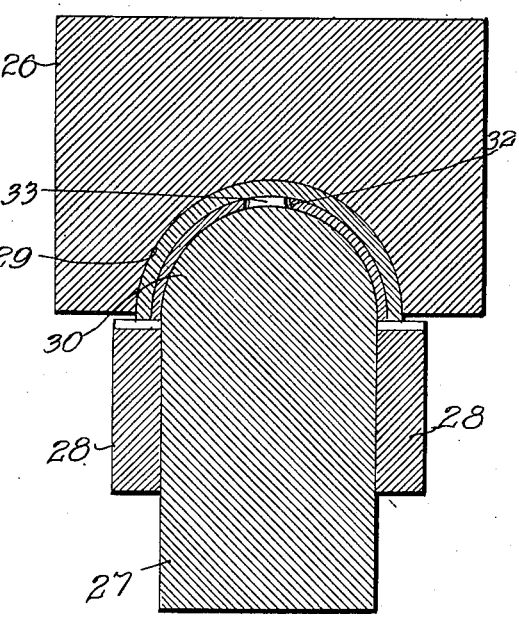
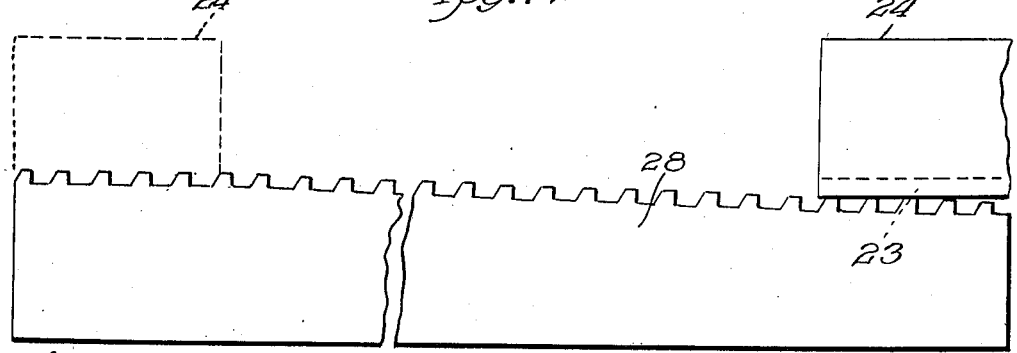
Witnesses:
Harry C. L. White
Inventor:
Berger Stockfleth
By Edward Fay Wilson
Atty Patented Oct. 15, 1935

2,017,448

UNITED STATES PATENT OFFICE 2,017,448

METHOD OF MAKING BEARINGS

Berger Stockfleth, Niles, Mich., assignor, by mesne assignments, to The Cleveland Graphite Bronze Company, Cleveland, Ohio, a corporation of Ohio Application February 4, 1931, Serial No. 513,317

4 Claims. (Cl. 29—149.5)

This invention relates to improvements in methods for making bi-metal articles such as half-cylindrical bearing sleeves.

Such sleeves consist of a back of strong, tough metal, such as steel, and a bearing metal lining, such as Babbitt metal.

This present application relates especially to improvements in methods of forming the lining in place out of bearing metal which is applied in such a heated condition as to be termed soft, viz., either in molten form or in slug form, the slugs being heated to a temperature at which they are soft or just ready to melt.

This present invention is an improvement on the earlier invention as disclosed in the co-pending application filed July 28, 1930, Serial No. 471,148.

In said application, the backing shell to which the bearing metal is applied is described as being preferably less than 180 degrees as originally formed and at the time the bearing metal is applied.

It has been found, however, that in applying the bearing metal in such soft form, there is not the necessity of extruding the longitudinal portions to the extent that has heretofore seemed necessary in the pressure method of forming such bi-metal sleeves. Consequently, with backing shells of less than 180 degrees, the sleeves are sometimes sized as to thickness without sufficient extensions at the edges to be able to finish the longitudinal edges and produce a sleeve of 180 degrees. The benefit of extending the edges of the backing shells somewhat beyond the 180 degrees is apparent when considered in connection with the method used in clamping the sleeves for the operation of trimming off their edges so that they are substantially half-cylinders.

By means of this present invention I am enabled to avoid such undesired results and the sleeves, as they leave the press, have edge portions which later can be trimmed off to produce sleeves of 180 degrees.

The invention resides in providing rough backing shells of slightly greater than 180 degrees extent. That is, the longitudinal edges of the shells extend beyond the half-circumference to a small amount. In usual sizes for use in bearings of automobile engines and similar sizes, such extensions are approximately about one-sixteenth of an inch at each side and these extensions are, preferably, straight as distinguished from being curved inwardly.

The invention will be more readily understood from the following description taken in conjunction with the appended claims and the accompanying drawings in which:—

Fig. 1 is a perspective view of my novel form of backing shell;

Fig. 2 is a fragmentary, vertical section of the die parts of a press illustrating the use of the backing shell, the die parts being separated;

Fig. 3 is a view similar to Fig. 2, the die parts being closed;

Fig. 4 is a perspective view of a completed sleeve bearing, the extruded edge portions which are removed being shown in dotted lines;

Fig. 5 is a diagrammatic vertical section of an edge trimming mechanism illustrating the setting of a sleeve for the edge trimming operation, the sleeve clamping parts or vise being open;

Fig. 6 is a sectional view similar to Fig. 5, the vise parts being closed; and

Fig. 7 is a fragmentary side elevation of one of the edge trimming cutters shown in operative relation to one of the sleeves.

In said drawings, 10 illustrates a backing shell which, as indicated by the diametrical line 11, has edge portions 12 which extend beyond a half-cylindrical shape. These edge portions 12 are preferably straight and extend substantially parallel with each other.

In the usual sizes of such shells for use in making bearing sleeves for the bearings of automobile engines, they preferably extend about one-sixteenth of an inch or less. In other words, the shell 10 is slightly greater in circumferential extension than 180 degrees.

Preferably, as shown, the shell 10 which may be and preferably is made of steel, is coated with a suitable bonding metal, such as tin, before the bearing metal lining is applied. The tin coating preferably covers both the inner surface, as shown at 13 and the outer surface as shown at 14.

Before the application of the bonding metal, the surface of the shell at the inner side thereof, as indicated at 15, is roughened to assist in the bonding of the bearing metal to the shell. This roughening may be accomplished by etching with acid or some other suitable means.

After the shell 10 has been prepared as described, a bearing metal lining is applied to the inner surface of the shell. This lining may be applied by different methods but I have chosen to illustrate the method disclosed in said copending application supra.

In this method, co-operating die parts 16 and 17 are provided. The lower die part 16 has a die opening 18 of the shape and size of the outer surface of the finished sleeve and the upper die part or plunger 17 has a co-operating end 19, the lower end of which has the form and shape of the inner surface of the finished sleeve. The plunger 17 is provided with end flanges 20 which are adapted to close the ends of the die space 18.

The bearing metal may be applied in molten condition, as shown at 21, Fig. 2, and in such application the prepared backing shell is first placed in the die opening 18 and then the upper die is partly lowered to close the ends of the die space so that the molten bearing metal, as shown at 22, will be retained in the place. The plunger 17 is lowered to substantially the position shown in Fig. 3 to distribute the bearing metal substantially uniformly on the backing shell. Then, as the bearing metal cools, the plunger 17 is forced down with great pressure to squeeze the sleeve and size and finish it.

In such final squeezing the edge portions, both the backing shell and the bearing metal lining are usually extruded to some extent, as shown at 23, but even if they are not appreciably extruded, the extended edge portions 12 of the backing shell provides parts which can be trimmed off to leave the finished sleeve, as shown at 24, a substantially exact half-cylinder.

Preferably, as indicated, the die parts are maintained heated to suitable temperatures as by electric heaters 25 arranged in suitable openings in the die parts.

In making bearing sleeves, the rough tinned shells 10 are preferably placed in the dies heated to the melting point of the bonding metal and the die parts are preferably maintained heated to approximately the melting point of the bonding metal, or slightly above, for obtaining the best results.

As the dies and sleeves are rather hot, this adds to the possibility of the rough sleeves being placed in the dies slightly off center, that is, with one edge lower than the other end, if the edges of the shells are not extended slightly beyond 180 degrees, the chances are that some of the lined sleeves will have to be discarded because they have not sufficient metal at one edge to be properly trimmed to produce the 180 degree finished sleeve. This present invention eliminates this possibility.

In Figs. 5 to 7, inclusive, the method preferably employed for trimming the edges of the sleeves is illustrated. The illustrations are diagrammatic only in that the more essential parts are shown. These consist of an upper vise block 26, a lower vise member 27 and cutter bars 28, one at each side of the lower member 27.

The upper vise member 26 has a sleeve receiving groove 29 in its lower side which fits the back of the sleeve as formed by die member 16 and the lower vise member 27 has an upper edge portion 30 which accurately fits the inner or lined side of the sleeve as formed by the upper die member or plunger 17.

As shown in Figs. 2 and 3, the lower end 19 of the upper die member 17 is provided with a small, flat, button-like projection 31 which forms a similar depression or pocket 32 in the lining of the sleeve. This pocket 32 is usually centrally located, as shown, and serves as a guide in placing the sleeves in the trimming machine.

The lower vise member 27 is provided on its top with a button-like guide projection 33 similar to the projection 31 on the upper die member 17. The guide projection 33 is somewhat smaller in diameter than the projection 31 and, consequently, than the opening 32 to facilitate the placement of the sleeves in position on the member 27.

As there is thus provided a certain amount of clearance between the guide projection 33 and the openings 32 in the sleeves, it may sometimes occur that in placing a sleeve on the vise member 27, the whole of this clearance might be at one side. In other words, the sleeve being clamped and trimmed might be tipped slightly to one side to the extent permitted by this clearance.

Such tipping of the sleeve, unless the edges of the sleeve were extended slightly beyond the 180 degree line, might result in the raised edge of the sleeve not being trimmed sufficient to provide a properly formed edge. This possibility is avoided by the extension of the edges of the rough sleeves somewhat beyond 180 degrees as explained.

It has not been thought necessary to illustrate the means for operating the vise members to clamp the sleeves or for operating the cutters 28, 30 such forming no part of the present invention.

The method shown of clamping and trimming the sleeves is not claimed herein, such forming the subject matter of the co-pending application filed July 28, 1930, Serial No. 471,148.

The method of making bi-metal sleeves shown herein is not claimed in this application except in combination with the rough sleeves having extended edges.

As variations of the invention will occur to one skilled in the art, I do not limit the invention to the specific details herein shown and described except within the scope of the appended claims.

I claim:

1. The herein described method of making a half-cylindrical bi-metal bearing sleeve of the character described, which consists in providing a backing member of tough, strong material such as steel roughly formed to approximately semi-cylindrical shape and somewhat greater than 180 degrees in transverse extension, applying bearing metal to the inner surface of such member and compressing the rough sleeve between suitable die members with sufficient pressure to cause both the backing member and the lining to be projected circumferentially to accurately form the inner and outer surfaces and the thickness of the sleeve, and completing the sleeve by trimming off the extending edge portions of both the backing and the lining sufficiently to leave a sleeve having a transverse extension of 180 degrees and whereby the original side edge portions are eliminated.

2. The herein described method of making a half-cylindrical bi-metal sleeve of the character described, which consists in providing a roughly formed backing shell of substantially half-cylindrical shape, the longitudinal edges of which extend slightly beyond 180 degrees, applying bearing metal to the inner surface of the shell in soft condition, subjecting the shell and the applied bearing metal to the forming action of suitable dies for accurately forming the outer and inner surfaces and the thickness of the shell and with sufficient pressure to cause both the backing and the lining to be extruded at the longitudinal edges of the sleeve, and later trimming off the edge extensions of both the backing and the lining to provide a substantially half-cylindrical sleeve and whereby the original side edge portions are eliminated.

3. The invention as defined in claim 1, the edge extensions of the sleeve beyond 180 degrees and before the pressing step being approximately parallel with each other.

4. The invention as defined in claim 1, the extensions of the edge portions of the backing blank beyond 180° being substantially parallel with each other.

BERGER STOCKFLETH.